Dec. 23, 1924.  
J. McCASKEY  
1,520,294  
AUTOMATIC ELECTRIC SAFETY SWITCH AND CARBURETOR CONTROL FOR AUTOMOBILES  
Filed July 3, 1923 2 Sheets-Sheet 1
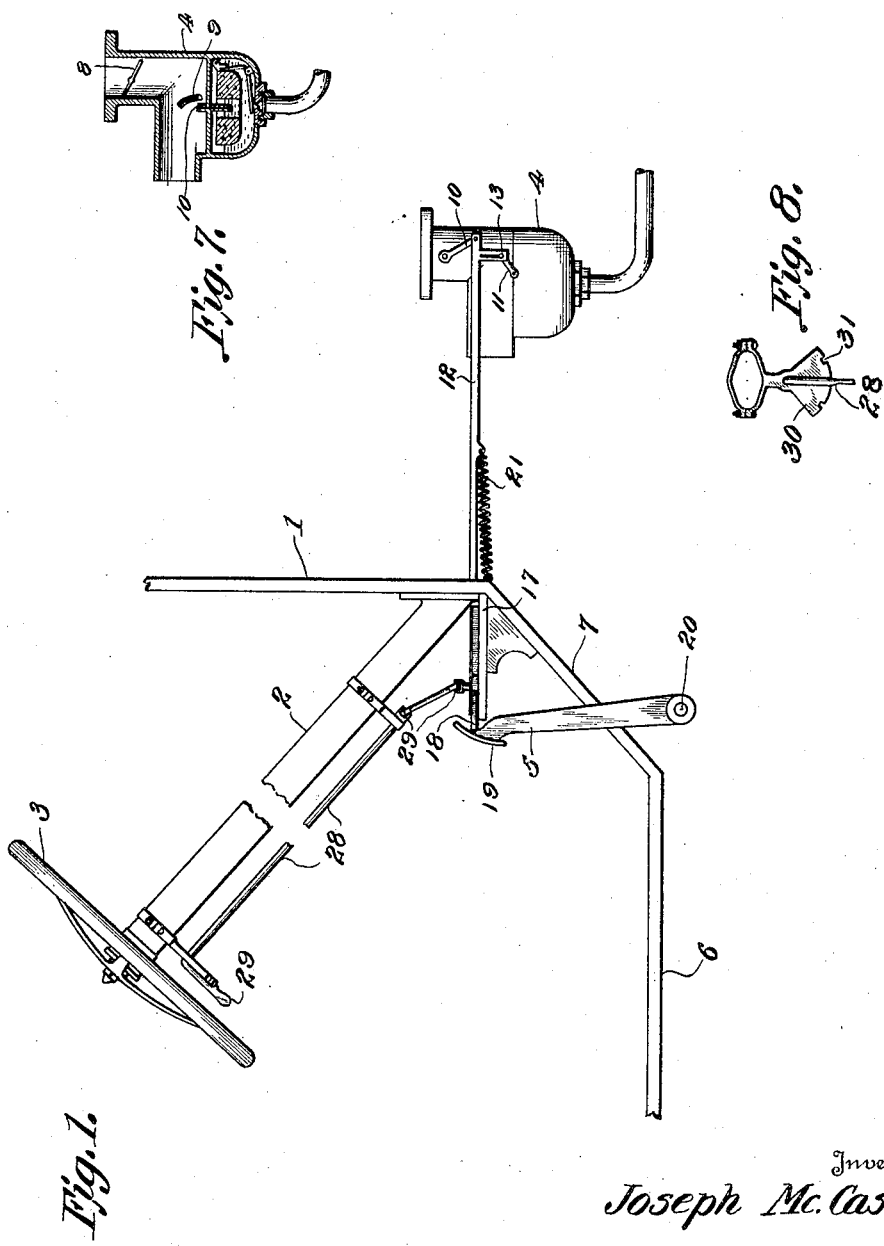
Inventor  
Joseph McCaskey.  
By Mason Fenwick & Lawrence.  
Attorneys Dec. 23, 1924.

J. McCASKEY 1,520,294

AUTOMATIC ELECTRIC SAFETY SWITCH AND CARBURETOR CONTROL FOR AUTOMOBILES

Filed July 3, 1923   2 Sheets-Sheet 2

Inventor
Joseph McCaskey,

By Mason Fenwick Lawrence
Attorneys

Patented Dec. 23, 1924.

1,520,294

UNITED STATES PATENT OFFICE.

JOSEPH McCASKEY, OF WILKESON, WASHINGTON.

AUTOMATIC ELECTRIC SAFETY SWITCH AND CARBURETOR CONTROL FOR AUTOMOBILES.

Application filed July 3, 1923. Serial No. 649,325.

*To all whom it may concern:*

Be it known that I, JOSEPH McCASKEY, a citizen of the United States, residing at Wilkeson, in the county of Pierce and State of Washington, have invented certain new and useful Improvements in Automatic Electric Safety Switches and Carburetor Controls for Automobiles; and I do hereby declare the following to be a full, clear, and exact description of the invention, such as will enable others skilled in the art to which it appertains to make and use the same.

This invention relates broadly to the provision of means for enabling a moving motor vehicle, such as an automobile, to be readily brought under control or to a standstill under conditions requiring quick action on the part of the operator. It often happens that under the excitement of a moment demanding quick action, the operator of a motor vehicle will operate the wrong instrumentalities and cause the vehicle to accelerate its speed rather than to retard or stop the vehicle. The present invention aims to correlate the ignition system, the carburetor and the clutch mechanism or brake control in such a manner that the operation of the pedal which controls the clutch or brake will automatically break the ignition and shut off the supply of fuel to the motor.

The arrangement between the ignition, carburetor and pedal which controls the clutch or brake is such that the mechanism can be set in a manner as to be unaffected by movements of the pedal so as to enable normal operation of the vehicle to be effected without interference to the ignition and fuel supply.

The various features of novelty and invention will appear from the detailed description taken in connection with the accompanying two sheets of drawing forming part of this specification.

Referring to the drawings, Fig. 1 is a diagrammatic view and side elevation showing sufficient parts of a motor vehicle to enable the application of the invention to be readily understood;

Fig. 7 is a vertical section through a carburetor; and

Fig. 8 is a plan view of the quadrant which is secured to the steering post below the steering wheel, controlling rod for the improved mechanism being shown in connection therewith.

Figure 3:
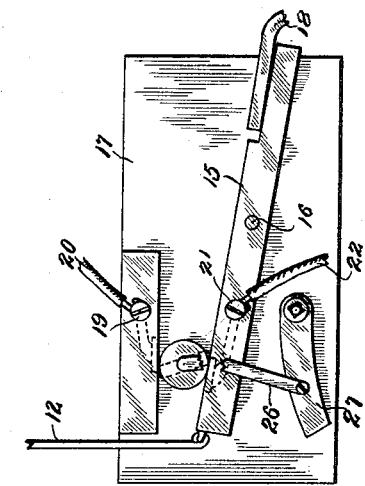
Fig. 3 shows the same parts arranged in position to automatically break the ignition and operate the carburetor when the pedal which controls the brake or clutch is operated.
Figure 6:
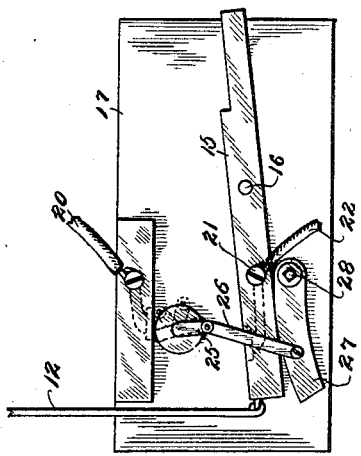
Fig. 6 is a view similar to Fig. 5 but different therefrom in showing the link which is broken away in Fig. 5.

In the drawings, numeral 1 indicates the instrument board of an automobile; 2 the steering column; 3 the steering wheel at the top of the column; 4 the carburetor; 5 a pedal for controlling either the clutch or brake of the automobile; 6 the floor of the automobile and 7 the inclined foot board between the dash-board and the floor.

The carburetor is provided with the usual valve 8 for controlling the admission of air into the engine and 9 indicates a valve capable of being turned to close the port 10, through which gasoline passes for mixing with the air. The valves 8 and 9 are shown in normal position.

The valve 8 is controlled by a crank or arm 10 and the valve 9 by a crank 11. Connected to the said arms in a manner to permit joint operation of the valves 8 and 9 is a controlling rod 12, which is preferably pivotally connected to the crank arm 10 and connected to the crank arm 11 by a pin and slot connection generally indicated at 13. The specific manner of connecting the control rod 12 to the valves 8 and 9 forms no part of my invention. Any suitable connection that will permit the valves 8 and 9 to be operated in unison by the control rod 12 is all that is necessary. The connection shown will permit the valve 8 to be opened beyond the point shown in Fig. 7 and will turn the valve 9 in position to close the top of the gasoline port 10 when the controlling rod 12 is moved toward the left. The purpose of this arrangement will more fully appear as the description proceeds.

Figure 5:
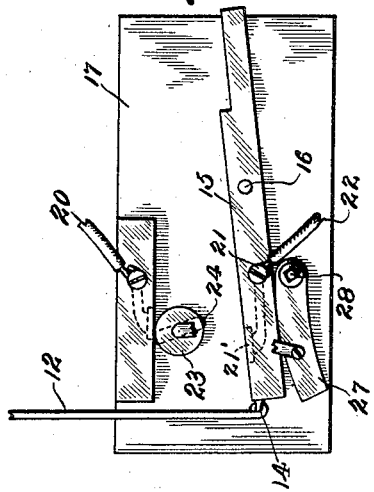
Fig. 5 is a view similar to Fig. 3 but showing the main controlling lever in a different position following the manipulation of the pedal.

The other end of the carburetor control rod 12 is pivotally connected as at 14 (Fig. 5) to one end of a lever 15, which is pivoted as at 16 to a base member 17, which is supported in any suitable manner, preferably in proximity to the base of the steering column 2. The other end of the lever 15 is adapted to lie behind a lateral extension 18 of the pedal, which is mounted on a shaft 20, which in turn is suitably connected to what may conveniently be termed a major controlling mechanism such as the clutch or brake of a motor vehicle.

Figure 4:
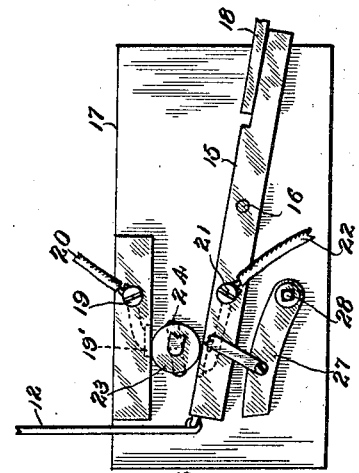
Fig. 4 shows how the parts may be positioned when it is desired to leave the vehicle unattended, the ignition being broken by means of a switch forming part of the control mechanism.

The lever 15, if unrestrained, will tend to turn in a counter-clockwise direction about the pivot 16 by reason of the spring, which is suitably anchored to the rod 12 and to a relatively fixed part of the automobile, as shown in Fig. 1. Referring to Figs. 3 and 4, it will be noted that the pedal extension 18 is so positioned as to prevent counter-clockwise rotation of the lever 15.

Mounted on the base member 17 is a binding post 19, to which is connected a wire 20 which leads to the distributor of the ignition system. The lever 15 is also provided with a binding post 21 to which is connected a wire 22 which leads to the fuse box.

Figure 2:
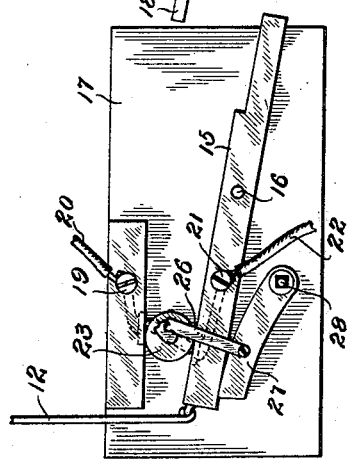
Fig. 2 is a plan view showing the position of the parts for permitting operation of the clutch or pedal control without affecting the ignition system or the carburetor.

Disposed between the binding posts 19 and 21 is a rotary switch body 23, of non-conducting material. Extending radially through this body is a conductor 24. This body and conductor constitute a switch member between the binding posts 19 and 21 when properly positioned for that purpose. The binding post 19 has a contact 19' (Fig. 4) and the binding post 21 has a contact 21' (Fig. 3), which is mounted in the lever 15. Figs. 2 and 3 show the two positions in which the switch may be placed for establishing connection between binding posts 19 and 21.

The switch body 23 is provided with a crank 25 by means of which the same may be turned by appropriate mechanism. A convenient means for turning the switch by means of the crank 25 includes a link 26, which is connected to a crank arm 27 fixed on a shaft which is constructed to extend up along the steering column 2 and terminates in a crank below the steering wheel 3. In order to take care of the angular position of the shaft with respect to the control rod 28, the latter may include suitable flexible connections such as universal joints 29.

The upper end of the control rod 28 extends through a quadrant bracket 30, which is secured to the steering column in any suitable manner, and the quadrant is provided with three notches 31 so that the control rod 28 may be held in three positions.

The three positions of the switch body 23 are shown in Figs. 2, 3 and 4. In the position shown in Fig. 4, the plug 24 of the switch is substantially horizontally disposed, while in Figs. 2 and 3, the plug is disposed at different angles to the vertical, but nevertheless in position to make contact through the binding posts 19 and 21.

The mode of operation of the device will now be given: It will be assumed that the apparatus is to be set in such position that the clutch or brake pedal can be manipulated without disturbing the flow of gas to the engine or interfering with the ignition system. Fig. 2 shows this position and it will be noted that the switch is set in such a manner that the plug 24 makes contact with the contact plates of the respective binding posts 19 and 21. The crank arm 27 is in abutting relation with the lever 15, which latter is therefore prevented from moving away from the switch body 23 even though the pedal extension 18 is removed from contact with the free end of the lever 15. The switch and arm 27 are maintained in this position by locking the manipulating rod 28 in one of the outer notches in the quadrant 30.

Referring now to Fig. 3, the mechanism is shown as being set in a manner which will break the ignition, shut off the supply of gasoline to the engine and open the air valve in the carburetor, when the pedal extension 18 is removed from the position shown in Fig. 3 to a position ahead of the lever 15, as for example is shown in Fig. 2. As soon as the pedal extension 18 is removed from the path of the lever 15, the latter will rotate in a counter-clockwise direction due to the action of the spring 21, and consequently the lever 15 will move away from the switch body 23 and consequently break the connection between the binding posts 19 and 21. The carburetor control rod 12 will at the same time turn the valve 8 to a more open position so as to enable plenty of fresh air to be drawn into the engine if the same is allowed to remain connected to the driving shaft, such as would be the case if the pedal 5 were a brake pedal having no direct connection with the clutch. It will be recalled that a motor vehicle is very frequently retarded in its speed, as for example when going down a hill, by allowing the engine to remain connected with the power transmitting mechanism leading to the rear wheels. At the same time that the valve 8 is opened to allow plenty of air to be drawn into the engine, the valve 9 will be brought into position to close the port 10 through which gasoline passes into the mixing chamber, and consequently no gas will be received into the engine.

In the position shown in Fig. 3, the control rod 28 will have been turned sufficiently far to position the handle 29 of the rod 28 in the notch at the other extremity of the quadrant.

By bringing the control rod 28 to a point intermediate the outer notches in the quadrant 30, the switch body 23 will be positioned as in Fig. 4, that is to say, the plug 24 in the switch body 23 is substantially horizontally disposed out of any possible contact with the contact members leading to or from the binding posts 19 and 21. When the parts are arranged in the position shown in Fig. 4, it will be obvious that the ignition system is broken or opened, and consequently that the engine cannot be started. Suitable means may be provided for locking the controlling rod 28 in neutral position, as will be readily appreciated.

It may also be pointed out that while the above described mechanism is primarily designed to be set into operation by the movement of the pedal which controls the clutch or brake, the arrangement of parts is such that the ignition system can be immediately broken by merely turning the control rod 28 to intermediate position, whereupon the switch will be turned into the position shown in Fig. 4.

It may also be pointed out that the switch body 23 is capable of being turned substantially through a half revolution in one direction. The initial position may be considered as being shown in Fig. 2, the next position in Fig. 4 and the half revolution from original position being shown in Fig. 3.

While the construction as illustrated in the drawing has been described with considerable particularity, it is to be understood that the main underlying idea of the invention is the provision of means as set forth in the appended claims.

What I claim is:

1. The combination with a normally provided pedal in a motor vehicle and the ignition system therefor, means responsive to movements of the pedal for breaking the ignition, and means connected to said means for preventing the breaking of the ignition when the pedal is moved.

2. The combination with a normally provided pedal in a motor vehicle and the carburetor and ignition system thereof, of means normally closing the ignition circuit, said means including a lever extending in the path of the pedal, means tending to move the lever to break the ignition circuit when the pedal is moved, and means for locking the lever in circuit-closing position irrespective of the movements of the pedal.

3. The combination with a normally provided pedal in a motor vehicle and the ignition system thereof, of a hand operable controlling rod for maintaining the ignition circuit in closed position, and means controlled by the pedal for opening the ignition circuit irrespective of the hand controlled means.

4. In a motor vehicle the combination with a carburetor having a valve for closing the flow of gas and for controlling admission of air into the engine, of manually controlled means for closing the gas valve and opening the air valve as one operation.

5. In a motor vehicle, the combination with a normally provided pedal and the carburetor therefor, the latter having a valve for cutting off the flow of gas and for varying the admission of air in the engine, a pull rod operatively connected to the said valves of the carburetor, a spring acting on the pull rod tending to close the gas valve and open the air valve, and means under the control of the pedal for maintaining said valves in normal position.

6. In a motor vehicle, the combination with a normally provided pedal and the ignition therefor, of a rotary switch and a lever located in the ignition circuit, and means for moving the lever to break the circuit when the pedal is moved.

7. In a motor vehicle, the combination with a normally provided pedal and the ignition therefor, of a rotary switch and a lever positioned in the ignition circuit, means for turning the rotary switch independent of the said lever, and means under the control of the pedal for breaking the circuit by means of the said lever.

8. In a motor vehicle, the combination with a normally provided ignition circuit, of a rotary switch and a lever positioned in the ignition circuit, means for rotating the switch to either open or close the ignition circuit through said lever, and means for locking the said lever in fixed position when the switch is in circuit-closing position.

9. In a motor vehicle, the combination with the normally provided ignition circuit and the carburetor, of a rotary switch and a lever positioned in the ignition circuit, a link connecting the lever to the carburetor, the latter having a gas valve and an air valve to which said link is connected, a hand operated device for breaking the ignition and manipulating the valves of the carburetor independently of the pedal, and a spring tending to operate the valve in the carburetor and to break the ignition when the pedal is operated.

In testimony whereof I affix my signature.

JOSEPH McCASKEY.